May 11, 1948. F. R. GOEHRING 2,441,483
METER VALVE
Filed Feb. 25, 1944 2 Sheets-Sheet 1

INVENTOR.
Francis Rudolph Goehring,
BY Jas. C. Hobensmith
Attorney.

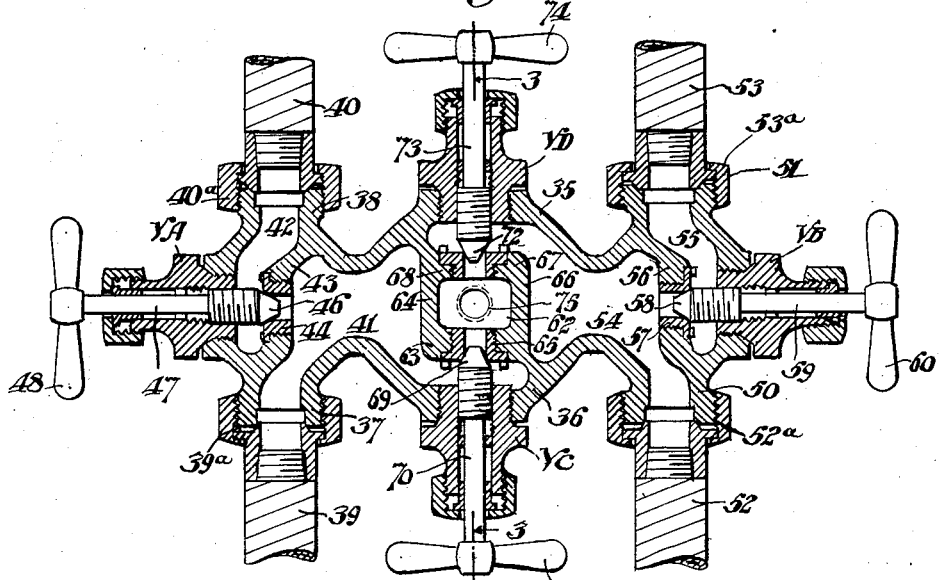

Patented May 11, 1948

2,441,483

UNITED STATES PATENT OFFICE 2,441,483

METER VALVE

Francis Rudolph Goehring, Philadelphia, Pa., assignor to H. Belfield Company, Philadelphia, Pa., a corporation of Pennsylvania Application February 25, 1944, Serial No. 523,794

3 Claims. (Cl. 277—57)

This invention relates to meter valves.

Flow meters and flow controllers as now employed are customarily connected to a restriction or differential flow device, such as a Venturi tube, a flow nozzle or an orifice plate. A pressure responsive mechanism is provided for measuring the differential pressure resulting from the effect of the restriction or differential flow device and for indicating, recording or controlling as a result of the change of differential pressure. The pressure responsive mechanism, usually in the form of a meter, employed for indicating, recording or controlling is customarily connected to the restriction or orifice in such a manner as to permit of equalizing the pressure at the meter or at the orifice, shutting off the connections to the meter, disconnecting the meter, or the accomplishment of other purposes.

The meters supplied by various manufacturers are not necessarily built to standard dimensions, with respect to center distances of the connections and the orifice connections are also not always built to uniform center distances.

It has heretofore been the custom to provide manifold piping consisting of single valves and T connections together with short lengths of pipe also welded into T shapes. The use of such structure in a conventional type of installation requires some twenty-six pipe connections, which when operation is required at high pressure, are particularly susceptible to leakage with consequent incorrect readings and indications.

In accordance with the present invention a meter valve of unitary construction is provided suitable for quick and easy installation with a greatly reduced number of pipe connections.

In accordance with the present invention also the likelihood of leakage and consequent inaccuracies of indication, recording or control are greatly reduced.

In accordance with the present invention also a valve manifold is provided which may be quickly and easily installed in existing installations and with the meter and orifice connections now installed and as made by various manufacturers.

The nature and characteristic features of the invention will be more readily understood from the following description, taken in connection with the accompanying drawings forming part hereof, in which:

Fig. 2 is a vertical central sectional view of the manifold or meter valve taken approximately on the line 2—2 of Fig. 3; and Fig. 3 is a transverse vertical sectional view taken approximately on the line 3—3 of Fig. 2.

Figure 1:
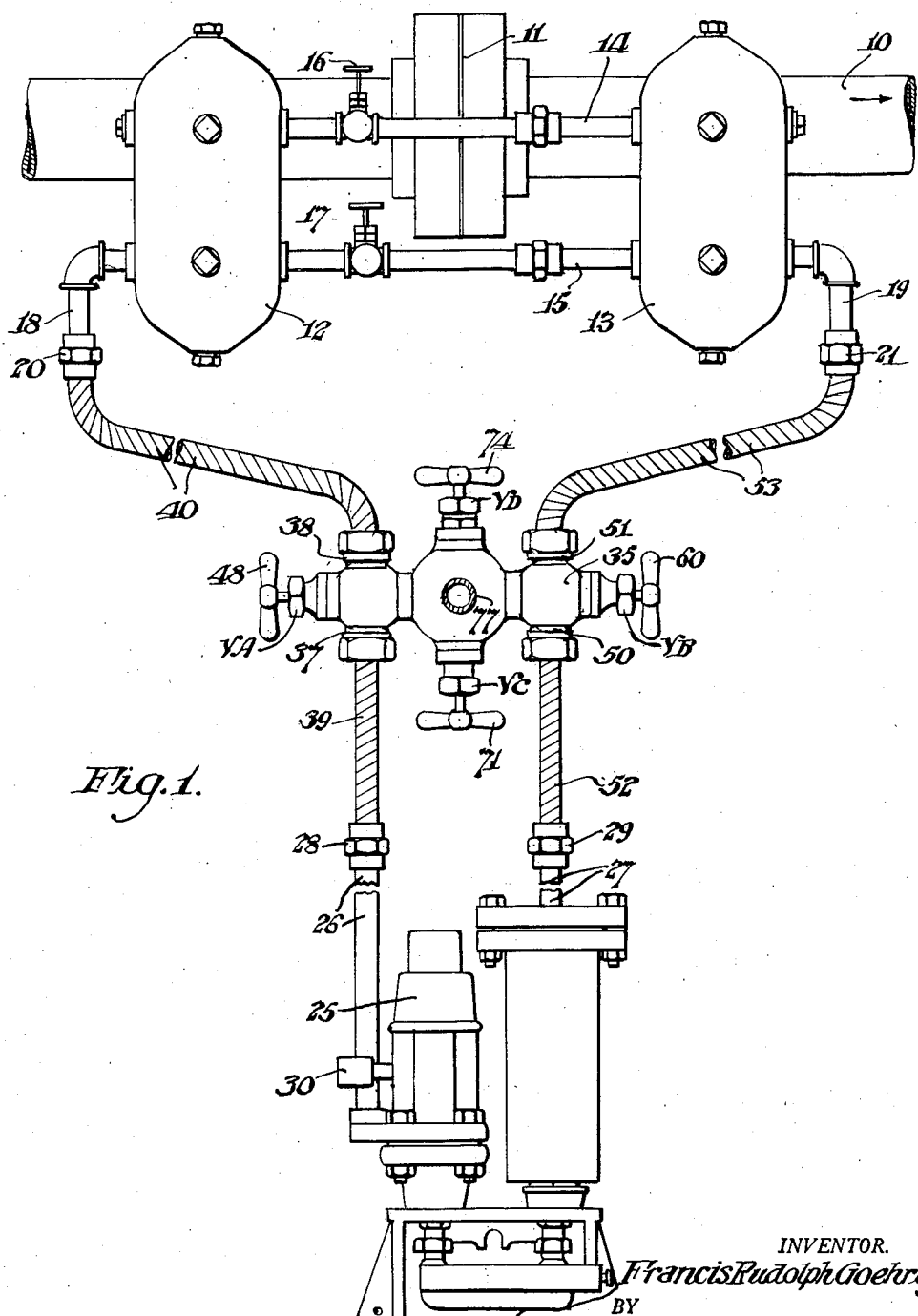
Figure 1 is a diagrammatic view of a differential flow meter installation having therein a manifold or meter valve embodying the present invention, the manifold or meter valve being shown in front elevation.

It will, of course, be understood that the description and drawings herein are illustrative merely and that various modifications and changes may be made in the structure disclosed without departing from the spirit of the invention.

Referring more particularly to the drawings, in Fig. 1 there is shown a pipe 10 for fluid flow, having an orifice plate or other form of restriction 11. Liquid sealing units 12 and 13 may be provided, on the upstream and downstream side, respectively, if required for use with a particular fluid flowing through the pipe 10. The sealing units 12 and 13 may be connected by cross over lines 14 and 15 having crossover control valves 16 and 17 therein. The sealing units 12 and 13 preferably have pipes 18 and 19 connected thereto in the usual manner for pressure transfer, the pipes 18 and 19 having unions 20 and 21 connected thereto.

A meter 25 which may be of any desired type for indicating, recording or controlling, and for electrical, pneumatic, or other transmitting of the differential pressure or a function dependent thereon. The meter 25 has an upstream pressure connection and a downstream pressure connection through pipes 26 and 27, connected to couplings 28 and 29 in the customary manner, and has a transmission connection 30.

The meter valve 35 is shown in detail in Figs. 2 and 3, and preferably includes a casing 36 of unitary construction. The casing 36 has a plurality of external connections and internal chambers, as hereinafter pointed out.

The casing 36, at one end thereof, has a lower fluid connection 37 and an upper fluid connection 38, preferably axially alined and with the center line therethrough vertically disposed. The lower connection 37 is adapted to be connected to the meter pipe 26 for the upstream side of the meter 25 by flexible tubing 39 which is provided with a coupling nut 39a and which extends to the coupling 28 where it is secured. The upper connection 38 is adapted to be connected to the sealing unit pipe 18 for the upstream side by flexible tubing 40 which is provided with a coupling nut 40a and which extends to the coupling 20 where it is secured.

The lower connection 37 is in communication with a chamber 41 within the casing 36, and the upper connection 38 is in communication with a chamber 42 within the casing 36. The chamber 41 is separated from the chamber 42 by a wall 43 having a vertically extending portion which carries a valve seating ring 44 with the axis of the latter perpendicular to the line of centers of the connections 37 and 38.

A manually operable valve VA is provided for controlling the flow past the seating ring 44. The manually operable valve includes a seating plug 46, an operating stem 47, and an operating handle portion 48.

The casing 36 at the other end thereof has a lower fluid connection 50 and an upper fluid connection 51 preferably axially alined and with the center line therethrough vertically disposed. The lower connection 50 is adapted to be connected to the meter pipe 27 for the downstream side of the meter 25 by flexible tubing 52 which is provided with a coupling nut 52a and which extends to the coupling 29 where it is secured. The upper connection 51 is adapted to be connected to the sealing unit pipe 19 for the downstream side by flexible tubing 53 which is provided with a coupling nut 53a and which extends to the coupling 21 where it is secured.

The lower connection 50 is in communication with a chamber 54 within the casing 36 and the upper connection 51 is in communication with a chamber 55 within the casing 36. The chamber 54 is separated from the chamber 55 by a wall 56 having a vertically extending portion which carries a valve seating ring 57 with the axis of the latter perpendicular to the line of centers of the connections 52 and 53. The valve seating ring 57 is preferably in axial alinement with the valve seating ring 44.

A manually operable valve member VB is provided for controlling the flow past the seating ring 57, the manually operable valve member including a seating plug 58, an operating stem 59 and an operating handle portion 60. The valve operating handles 48 and 60 are thus oppositely disposed at the ends of the casing 36 and with their stems 47 and 59 in alinement.

At the center portion of the casing 36 an internal chamber 62 is provided. The internal chamber 62 is separated from the chamber 41 by a wall having a lower horizontal portion 63 and a vertical side portion 64. A valve seating ring 65 is mounted in the horizontal wall portion 63 preferably with its axis perpendicular to the axial line of the seating rings 44 and 57. The internal chamber 62 is separated from the chamber 54 by a wall having a vertically extending portion 66 and a horizontal portion 67. A valve seating ring 68 is provided in the horizontal portion 67 and preferably in such manner as to be co-axial with the seating ring 65.

A manually operable valve member VC is provided for controlling the flow past the seating ring 65, the manually operable valve member including a seating plug 69, and operating steam 70, and an operating handle portion 71.

A manually operable valve member VD is provided for controlling the flow past the seating ring 68, the manually operable valve member including a seating plug 72, an operating stem 73, and an operating handle portion 74. The valve operating handles 71 and 74 are thus oppositely disposed below and above the casing 36 at the mid-portion thereof and with their stems 70 and 73 in alinement.

The chamber 62 preferably also has connected thereto a pipe 75 having a valve 76 therein, the valve 76 serving for venting, as hereinafter pointed out. The chamber 62 also has connected thereto a pipe 77 having a blowoff valve 78 therein, for purposes to be explained. The valve stems 47, 59, 70 and 73 are preferably supported and provided with suitable packing in the manner customary with valves for high pressure service.

The mode of use of the meter valve 35 will now be pointed out.

The meter valve 35 may be readily connected up as desired either to new or to existing installations by connecting the flexible tubing 40 and 53 from the fluid connections 38 and 51 to pipes 18 and 19, the flexible tubing accommodating itself readily to differences in center distances of the pipes 18 and 19. The flexible tubing 39 and 52 are also connected to the pipes 26 and 27, the flexible tubing readily acommodating itself to differences in center distances of the pipes 26 and 27 of the meter 25.

A choice of different operating conditions is available, dependent upon the selected and sequential operation of the manually controlled valves.

For normal functioning of the meter 25 the valve operating handles 71 and 74 of the valves VC and VD are operated so that the seating plugs 69 and 72 are seated on their seating rings 65 and 68. The valves VA and VB then function as transfer valves for connection of the differential pressure connections 18 and 19 from the orifice 11 for operation of the meter 25 in the customary manner. The pressure on the upstream side of the orifice 11 is effective from the sealing unit 12, through the pipe 18, the flexible tubing 40, the chamber 42, the chamber 41, the tubing 39 and the pipe 26 to the meter 25. The pressure on the downstream side of the orifice 11 is effective from the sealing unit 13, through the pipe 19, the flexible tubing 53, the chamber 55, the chamber 54, the flexible tubing 52, and the pipe 27 to the meter 25.

If desired, of course, the valve VA may be opened with all the other valves closed or the valve VB may be similarly operated.

The valves VC and VD function as equalizing valves or as secondary bleeder valves, and may be operated as desired. For example if it is desired to vent to the atmosphere the upstream side of the connections to the meter valve 35, the valve VA is opened, the valve VD is closed, the valve VC is opened and by reason of the communication thus provided through the chamber 42, and the chamber 41 to the chamber 62, the valve 76 may be manipulated as desired to effect such venting. If it is desired to blow down this portion of the system under these conditions the blow-off valve 78 may be operated in place of the needle valve 76.

The downstream side of the connections to the meter valve 35 may similarly be vented to the atmosphere. For this purpose the valve VB is opened, the valve VC is closed, the valve VD is opened, and by reason of the communication thus established through the chamber 55, and the chamber 54, to the chamber 62, the needle valve 76 may be manipulated as desired to effect such venting. This portion of the system may also be blown down under these conditions by operating the blow-off valve 78 in place of the valve 76.

If it is desired to equalize the pressure at the meter 25 and in the orifice connections 18 and 19 this may be accomplished by opening the valves VA, VB, VC, and VD with the valves 76 and 78 closed. If it is desired to equalize the pressure only at the meter 25 this may readily be accomplished by opening the valves VC and VD, the other valves being closed.

It will be seen that because of the location of the operating handles 71 and 74 of the equalizing valves VC and VD in alinement and at the central portion of the casing 36, the location of the operating handles 48 and 60 of the transfer valves VA and VB at the ends of the casing 36 and adjacent the tubing 39, 40 and 52, 53, as well as the location of the valves 76 and 78 in pipes indicating their function by their directional arrangement, the likelihood of error in the use of the meter valve 35 is greatly reduced.

It will also be seen that there is provided a meter valve 35 which is relatively simple in construction and which may be built to withstand pressures of the order of 1,500 pounds or more without likelihood of leakage and with complete control of the meter 25 and its connections.

I claim:

1. A unitary valve structure for connecting flow meters and the like comprising a casing having a pair of fluid connections at each end thereof, walls in opposite end portions of said casing and interposed between the fluid connections of each pair and providing end chambers each in communication with one of the fluid connections of a pair and bounding intermediate chambers each in communication with the other of the fluid connections of a pair, spaced walls at the central portion of said casing providing in said casing a central chamber between said intermediate chambers, each of said walls having a passageway provided with a valve seat, and manually operable valve members for engagement with said seats, the valve members and seats at the ends of the casing controlling the flow through the respective end fluid connections, and the valve members and seats at the central portion of the casing respectively controlling communication between said intermediate chambers and said central chamber for permitting by-passing of fluid between said end fluid connections when the other valve members are raised from their seats.

2. A unitary valve structure for connecting flow meters and the like comprising a casing having a pair of fluid connections at each end thereof, walls in opposite end portions of said casing disposed substantially parallel and interposed between the fluid connections of each pair and providing end chambers each in communication with one of the fluid connections of a pair and intermediate chambers each in communication with the other of the fluid connections of a pair, spaced walls at the central portion of said casing providing in said casing a central chamber between said intermediate chambers, each of said walls having a passageway provided with a valve seat, manually operable valve members for engagement with said seats, the valve members and seats at the ends of the casing being alined and controlling the flow through the respective end fluid connections, and the valve members and seats at the central portion of the casing controlling communication between said intermediate chambers and said central chamber for permitting by-passing of fluid between said end fluid connections when the other valve members are raised from their seats, and independent means connected to said central chamber for controlling the fluid flow from said central chamber for discharge.

3. A unitary valve structure for connecting flow meters and the like comprising a casing having a pair of alined fluid connections at each end thereof, walls in opposite end portions of said casing disposed substantially parallel and interposed between the fluid connections of each pair and providing end chambers each in communication with one of the fluid connections of a pair and intermediate chambers each in communication with the other of the fluid connections of a pair, spaced walls at the central portion of said casing providing in said casing a central chamber between said intermediate chambers, each of said walls having a passageway provided with a valve seat, manually operable valve members for engagement with said seats, the valve members and seats at the ends of the casing being alined and controlling the flow through the respective end fluid connections, and the valve members and seats at the central portion of the casing being disposed normal to the alinement of the end valve members and seats controlling communication with said central chamber for permitting by-passing of fluid between said end fluid connections when the other valve seating members are raised from their seats, and independent means connected to said central chamber for controlling the fluid flow from said central chamber for discharge.

FRANCIS RUDOLPH GOEHRING.

REFERENCES CITED

The following references are of record in the file of this patent:

UNITED STATES PATENTS

| Number | Name | Date |
| --- | --- | --- |
| 103,872 | Greene | June 7, 1870 |
| 1,262,630 | Brown | Apr. 16, 1918 |
| 1,664,909 | Thomson | Apr. 3, 1928 |
| 2,042,186 | Peterson | May 26, 1936 |
| 2,160,563 | Roesch | May 30, 1939 |
| 2,331,133 | Nardone | Oct. 5, 1943 |
| 2,332,244 | Martin | Oct. 19, 1943 |
| 2,352,629 | Griswold | July 4, 1944 |